US012667796B1

(12) United States Patent
Kazadi et al.

(10) Patent No.: US 12,667,796 B1
(45) Date of Patent: Jun. 30, 2026

(54) LOW ENERGY LIQUID DEGASIFICATION SYSTEM AND METHOD

(71) Applicant: Kazadi Enterprises Ltd., Batavia, IL (US)

(72) Inventors: Sanza T. Kazadi, Batavia, IL (US); Daniel J. Terry, Batavia, IL (US)

(73) Assignee: Kazadi Enterprises Ltd., Batavia, IL (US)

( * ) Notice: Subject to any disclaimer, the term of this patent is extended or adjusted under 35 U.S.C. 154(b) by 0 days.

(21) Appl. No.: 19/442,869

(22) Filed: Jan. 7, 2026

(51) Int. Cl.
*B01D 53/22* (2006.01)
*B01D 19/00* (2006.01)

(52) U.S. Cl.
CPC ..... *B01D 19/0068* (2013.01); *B01D 19/0052* (2013.01); *B01D 19/0078* (2013.01)

(58) Field of Classification Search
CPC ............ B01D 19/0068; B01D 19/0052; B01D 19/0078
See application file for complete search history.

(56) References Cited

U.S. PATENT DOCUMENTS

| | | | | |
|---|---|---|---|---|
| 502,437 | A | * | 8/1893 | Robert ...................... F25C 1/04 62/505 |
| 4,438,834 | A | * | 3/1984 | Handke ................... F16F 9/364 188/315 |
| 4,948,537 | A | * | 8/1990 | Ohkoshi .......... B29D 11/00269 264/102 |

| | | | | |
|---|---|---|---|---|
| 2004/0079650 | A1 | * | 4/2004 | Morkovsky ......... C02F 1/46104 205/742 |
| 2006/0198796 | A1 | * | 9/2006 | Giniger .................. A61Q 19/02 424/53 |
| 2006/0198803 | A1 | * | 9/2006 | Giniger .................... A61K 8/90 424/70.4 |
| 2006/0229226 | A1 | * | 10/2006 | Giniger .................... A61K 8/22 510/392 |
| 2012/0247324 | A1 | * | 10/2012 | Kramer .............. B01D 19/0005 95/24 |
| 2015/0135714 | A1 | * | 5/2015 | Benn ....................... F01B 23/08 60/671 |
| 2016/0102397 | A1 | * | 4/2016 | Moore ..................... C25D 5/34 118/729 |
| 2019/0375674 | A1 | * | 12/2019 | Kelley .................... C03C 15/00 |
| 2020/0246724 | A1 | * | 8/2020 | Shoykhet .............. G01N 30/34 |
| 2020/0298232 | A1 | * | 9/2020 | Madadi ............. B01L 3/502707 |

* cited by examiner

*Primary Examiner* — Anthony Shumate
(74) *Attorney, Agent, or Firm* — Seed Intellectual Property Law Group LLP

(57) ABSTRACT

A low energy liquid degasification device has a liquid reservoir connected to an input channel above it and a cylinder below it. The input channel has several embedded isolation valves which allow the channel to be closed off into several independent chambers. The cylinder has a piston capable of moving up and down under the action of an actuator located below it and which seals the cylinder. Upon filling the liquid reservoir, input channel, and cylinder above the piston with a largely incompressible and inexpansible liquid and sealing the isolation valves, the piston is moved downward increasing the enclosed volume and generating a vacuum. Agitation of the assembly produces cavitation and pressure waves inside, generating bubbling that removes dissolved gas from the liquid.

11 Claims, 6 Drawing Sheets

LOW ENERGY LIQUID DEGASIFICATION SYSTEM AND METHOD

BACKGROUND

Technical Field

The present disclosure relates to methods and systems for degasification of a liquid, and preferably, to methods and systems for degasification of a liquid using extremely low energy.

Description of the Related Art

In many industrial environments, it is desirable to remove gas from a quantity of liquid, often as much gas as possible. This may be accomplished via degasification. As an example, during chemical synthesis it is often important to remove dissolved gas to eliminate unwanted side reactions that could generate undesirable products. As another example, water in boiler systems must be degassed to limit the damage due to cavitation during use. In still another example, water in a vacuum system may be degassed in order to maintain a truer vacuum for a longer period of time.

BRIEF SUMMARY

Summary and Abstract summarize some aspects of the present disclosure. Simplifications or omissions may have been made to avoid obscuring the purpose of the Summary or the Abstract. These simplifications or omissions are not intended to limit the scope of the present disclosure.

In one embodiment of the invention, a low energy degasification system is disclosed. The degasification system includes a chamber assembly with a smooth interior surface which specifically has no dead zones on the inner surface that contacts head space that emerges from the liquid. The degasification system further includes a liquid entry pathway into the chamber assembly which is configured to be able to be closed and sealed, which enables the chamber to be hermetically sealed. Additionally, the degasification system includes an expansion system for expanding the volume of the chamber once it is sealed, and a cavitation generator for generating cavitation in the chamber assembly.

DETAILED DESCRIPTION

Figure 1:
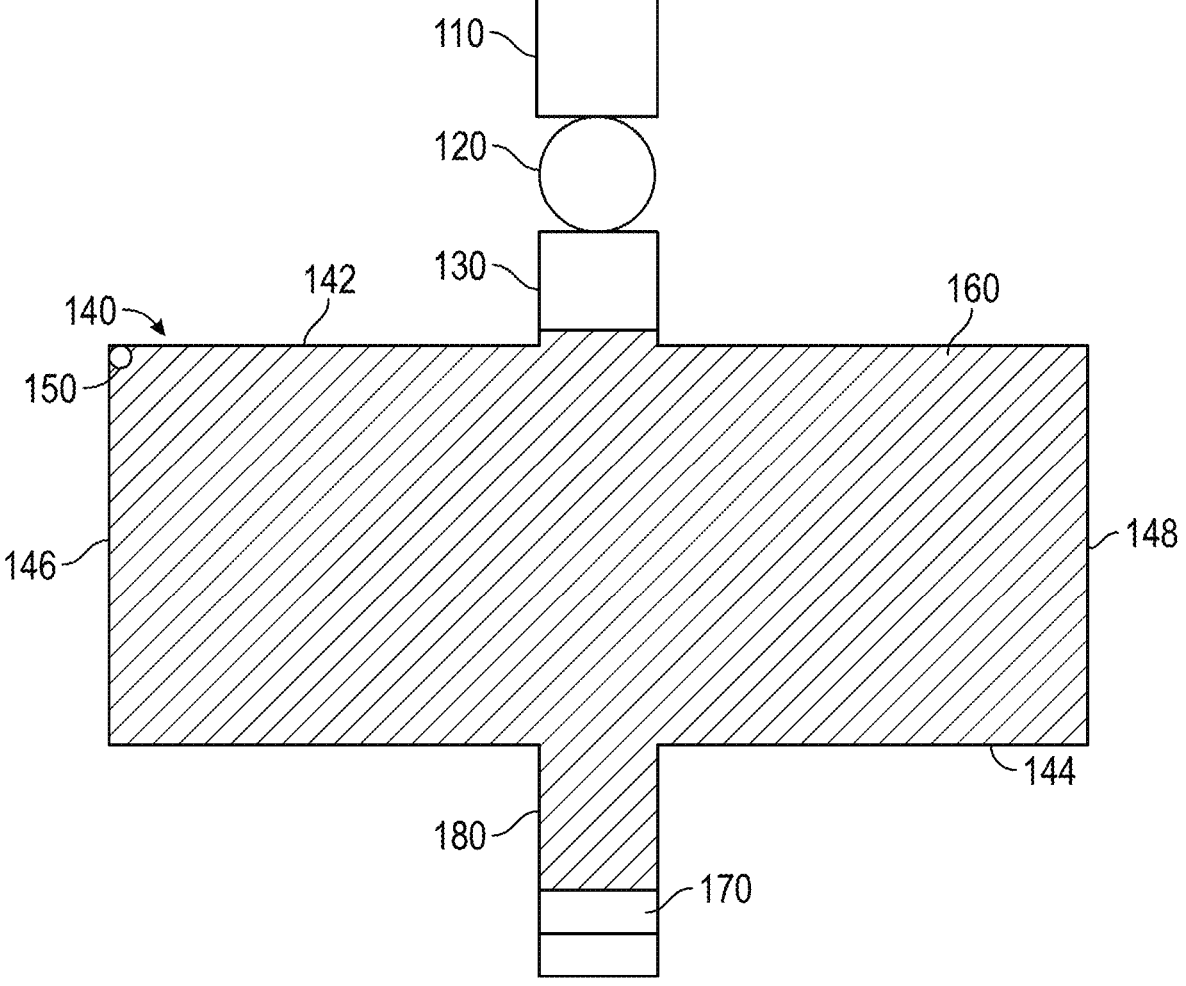
FIG. 1 shows the cross section of the chamber and liquid entry pathway of a smooth degasser where the chamber has a ninety degree angle on one of its surfaces which traps a bubble in a corner dead zone.

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide a system and method for low energy degasification. Representative examples utilizing many of these additional features and teachings, both separately and in combination, are described in further detail with reference to attached FIGS. 1-8. This detailed description is merely intended to teach a person of ordinary skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice all aspects of the teachings of the present system and method.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples in some embodiments. In some embodiments, the dimensions and the shapes of the components shown in the figures are intended to limit the dimensions and the shapes of the components.

When a liquid is exposed to a gas, some amount of gas naturally dissolves into the liquid. The amount of gas dissolved in the liquid varies significantly depending on the composition of both the gas and the liquid. Additionally, the amount of gas dissolved in a liquid further depends on the specific chemical compatibility of the gas and the liquid. Further, the amount of dissolved gas can be highly dependent on the temperature. For instance, the solubility of nitrogen in water at 0.101325 MPa ranges from a logarithmic value of −11.7 to −10 between 345 and 610 K.

In some chemical reactions and some physical systems, the presence of dissolved gas in the liquid can cause problems. For example, in a system that is desired to be maintained under vacuum (or other pressurized state), the presence of dissolved gas in the liquid can diminish the vacuum (or other pressurized state) of the system. As a result, it is desirable to remove as much of the dissolved gas as possible to avoid cross reactions, adverse physical conditions, and the like. A variety of methods exist to remove air from liquid, including exposure to vacuum, sparging (in which one gas is bubbled through a liquid to push out another dissolved gas), heat, chemical reactions, and combinations of these methods. While a theoretical vacuum is essentially empty space, lacking any solids, liquids, and gases, a vacuum as defined herein, is any space having a lower presser than the pressure of the surrounding space, resulting from the removal of some or most particles, liquids, and gasses from the space.

Cavitation events are often used to accelerate the removal of dissolved air in a liquid under vacuum. Cavitation events are phenomena that occur when, following swift motion of a moving submerged or partially submerged device or surface, a low pressure area of the liquid is produced which results in the generation of bubbles filled with the primarily liquid vapor. The bubbles subsequently collapse, producing a pressure shockwave that, when the liquid is under vacuum, further leads to rarefaction of the liquid. Some amount of gas contained in the liquid emerges from the liquid as bubbles which can be removed mechanically.

The term "degasification" and the phrases "removing air from liquids" and "removing dissolved air from liquids" and the like are used interchangeably in the present specification. Some embodiments described herein disclose methods of removing dissolved gas from liquids (degasification) using a combination of a vacuum imposed using minimal mechanical energy and a method of producing cavitations. The method of producing cavitations may include physically moving the chamber containing the liquid, using sound to induce vibrations, or moving a device within the chamber.

One such method for degassing liquids involves inserting liquid into a hermetically sealed chamber through a valve, closing the valve, sealing the chamber, expanding the chamber, and then generating cavitation events. During expansion of the chamber, the liquid in the chamber (which is relatively incompressible and inexpandable) moves to the bottom of the expanded chamber, and does not fill the expanded chamber. As a result, some portion of the liquid immediately evaporates, and the gas fills the remainder of the expanded chamber above the liquid, since the liquid is more dense than the gas.

The part of the expanded chamber that does not contain liquid is known as the "head space of the chamber" or simply "head space." The gas in the liquid emerges immediately after the chamber has expanded. Once the cavitation events occur, the gas emerges at a dramatically accelerated pace, which can be many orders of magnitude quicker than without the cavitation. The cavitation events generate pressure waves, which tend to cause nucleation points (points where bubbles tend to form), within the liquid. The bubbles rise to the surface of the liquid and the gas inside them collects in the head space above the liquid. Subsequently, the gas is forced out of the chamber by the reduction of the chamber's size, which pushes the liquid upward, again filling the space and leaving no space for the gas that emerged.

The degasification method typically includes more than one cycle during which a progressively smaller amount of gas is removed as the liquid becomes more degassed. The pressure above the liquid during the cavitation stages becomes lower and lower each cycle. Eventually, the liquid is so well degassed that either the movement of the gas out of the chamber fails to measurably occur in a cycle, or the rate at which the gas comes out of the liquid becomes prohibitively low (such that the time and energy required to wait becomes unreasonably long).

Unfortunately, the chamber used in this degasification process can impede the effectiveness of the degasification process due to its configuration, construction, and surface smoothness. For example, cylindrical chambers are typically built using a cylindrical wall capped on two ends by circular surfaces. These surfaces meet at a circular boundary on the ends, generally forming a nearly 90 degree angle between the surfaces. During operation, gas enters the part of the junction that is above the liquid. When the chamber is contracted, expelling the gas and liquid, some bubbles can be compressed into these junctions and remain in the chamber, with the two walls of the junction providing sufficient stabilization to hold the bubbles in place.

This situation is illustrated in FIG. 1, where a chamber 140 is depicted in a cross section and a bubble 150 is located in the seam between two surfaces. During subsequent cycles of operation, these bubbles expand, generating a higher pressure in the system than desired and impeding the removal of additional gas. As a result, the degasification process fails to achieve a significantly low pressure.

At the root of this phenomenon is the creation of points on the top surface 142 of the chamber 140 where the gas collects (to be subsequently pushed out), and the velocity of the liquid passing over the surface becomes too low to push the gas from these points toward the exit (for example, the valve 120). This can happen for a variety of reasons, including one or more of a crack or scratch in the surface, a seam between two surfaces where gas can collect, rough surfaces, sharp angles, both convex and concave configurations that are too extreme in magnitude.

The commonality is that gas becomes trapped. Due to the way in which liquid flows over the surface, the flow pressure is insufficient to dislodge a bubble trapped against the surface. These locations are called "dead zones,". They are characterized by the flow of liquid over the surface being insufficiently fast or of a high enough pressure to prevent gas bubbles from adhering to the surface. In such dead zones, the flow of liquid over the surface does not enable gas bubbles to be dislodged by the liquid flow. Also, too, the existence of dead zones is a function of the flow characteristics of the liquid moving over the surface.

Accordingly, an effective degasification system or method does not include any junctions between surfaces, and does not create cavities in which gas may intrude and lodge when the remainder of the gas is ejected from the chamber. This creates significant restrictions on the design of the chamber within the head space, such as limiting how many pieces may be made or how these cavities can be filled once multiple pieces are joined.

Additionally, these restrictions limit the shapes that may be built into the chamber. For example, all shapes are eliminated that would tend to retain bubbles once the gas is ejected. As an example, concave chambers cannot be used, since they not only have a large roughness, but also retain gas that must be ejected during degassing cycles. Such chambers include "dead zones." As a result, the chamber is more optimally redesigned to eliminate dead zones. With this configuration control, the level of dissolved gas contained in the liquid being degassed can be significantly enhanced.

Notably, there are embodiments where the configuration of the chamber itself can affect the functionality of the overall system. As illustrated in FIG. 1, if the chamber is a simple cylinder, then the edges of the cylinder are problematic. FIG. 1 depicts a cylindrical chamber 140 with an upper seal 110 just above a valve 120 and a valve housing 130 at the upper center of the chamber. The cylindrical chamber 140 includes a top surface 142 and bottom surface 144 that are perpendicular to the cylinder's sidewalls 146 and 148. The cylindrical chamber 140 has a main cylinder cavity that contains a liquid 160.

At the bottom of the cylindrical chamber 140 is positioned a piston 170 and a cylindrical housing 180. The piston 170 is located within the cylindrical housing 180. The piston 170 and the cylindrical housing 180 are operatively connected to the main cylinder chamber, and are used to expand or contract the chamber. In this suboptimal chamber configuration, as the piston 170 contracts the space within the cylindrical chamber 140, one or more bubbles 150 may be retained within the liquid 160 in a corner of the cylindrical chamber 140, as shown in FIG. 1.

Upon expansion of the cylindrical chamber 140 in the next cycle, which is enabled by movement of the piston 170 in the cylindrical housing 180, the bubble 150 expands to fill a head space above the liquid 160. As a result, the bubble's gas will fill the head space, which increases the pressure above the liquid 160 and reduces the ability of the system to degas the liquid. Accordingly, the failure to completely remove bubbles 150 from the liquid 160 in dead zones of the cylindrical chamber 140 results in failure to effectively degas the liquid 160 in the cylindrical chamber 140.

Figure 2:
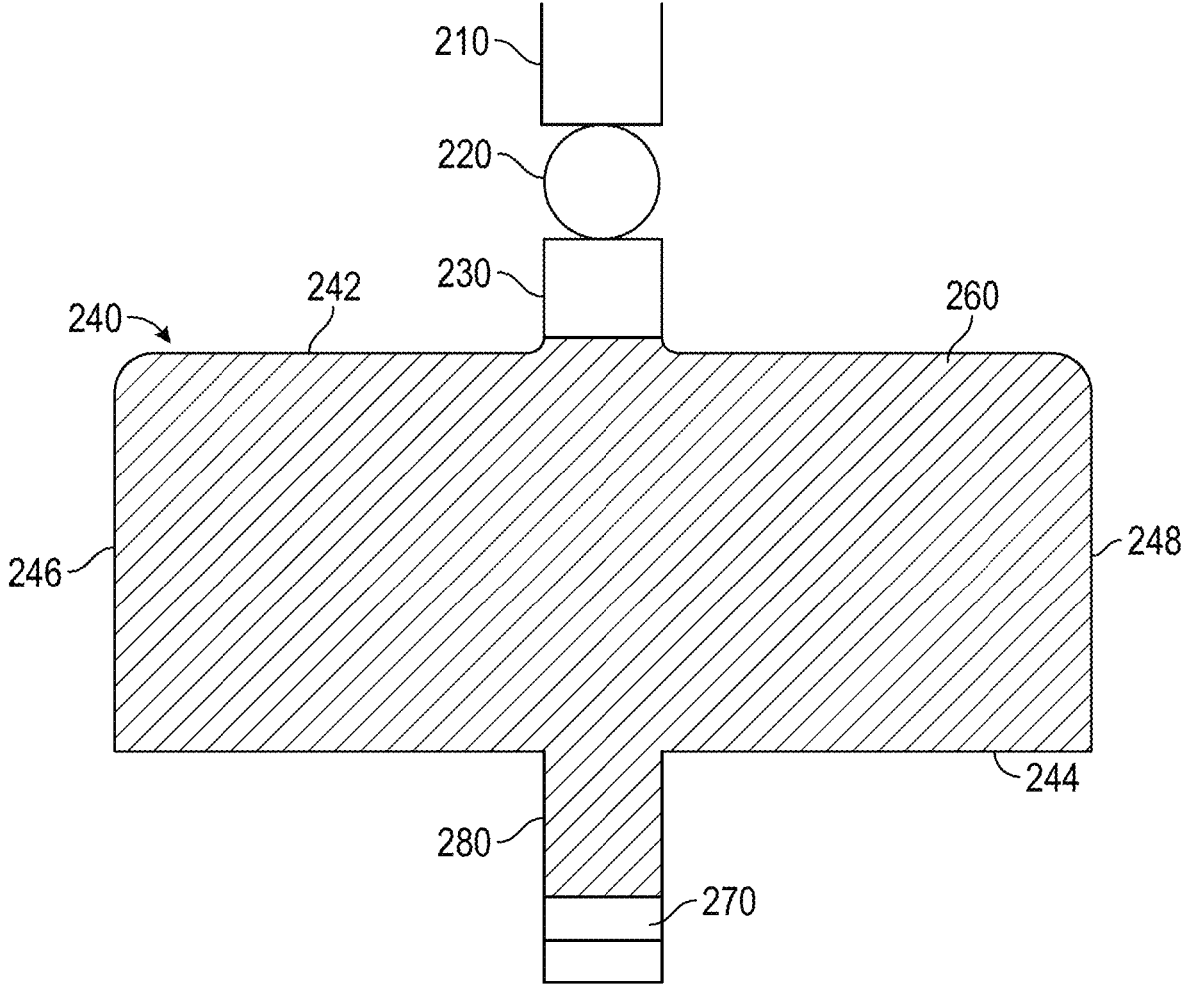
FIG. 2 illustrates the cross section of the chamber and liquid entry pathway of a smooth degasser where the chamber is made up of multiple pieces. Despite the smooth angles of the chamber, which avoid trapping bubbles as illustrated in FIG. 1, the chamber still contains dead zones at the joints where the pieces connect.

This situation can be corrected by eliminating the sharp edges of the chamber as illustrated in FIG. 2. In FIG. 2, the cylindrical chamber 240 is designed with rounded corners between the top surface 242 and the cylinder's sidewalls 246 and 248 that are perpendicular to the top surface 242 and the bottom surface 244 of the cylindrical chamber 240. Due to the configuration change of these corners, the bubble 150 retained in the dead zones of the previous version (shown in FIG. 1) is not retained. Moreover, in FIG. 2, the valve housing 230 of the valve 220 has a rounded connection point, making the movement of liquid 260 in this space smoother when the piston 270 in the cylindrical housing 280 is raised, which reduces the overall chamber volume of the cylindrical chamber 240.

In addition to proper chamber configuration, the chamber of a smooth degasser also has chamber surfaces with sufficient smoothness to avoid creating dead zones. Confirming that the chamber has sufficient smoothness is a challenging endeavor. To achieve sufficient smoothness, the surface must have a roughness that is sufficiently small. Standard roughness measures may be identified by ISO standards, such as ISO 21920-2:2021. The maximum roughness capable of enabling the release of a gas bubble in contact with the surface is a function of the size of the bubble, the gasses involved, the material of the chamber walls, the liquid being used, the temperature of the liquid and the chamber, the pressure of the liquid moving inside the chamber, and the angle at which the chamber surfaces are inclined.

When the roughness of the inner chamber wall satisfies this minimum limitation for all bubble sizes that might affect a maximum level of gas removal from the liquid, it is smooth enough to release the bubbles at this level of degasification. A chamber that has this minimum roughness throughout its interior surface is defined as smooth enough to release the bubbles inside the chamber. In one such embodiment, an enclosed vessel defines an interior chamber with at least one fluid-contacting wall surface configured for laminar flow of the liquid at a shear rate of 1-100 $s^{-1}$, where the wall surface is sufficiently smooth, such that heterogeneous nucleation of microbubbles is inhibited, and any transient microbubble adhesion is precluded.

Figure 3:
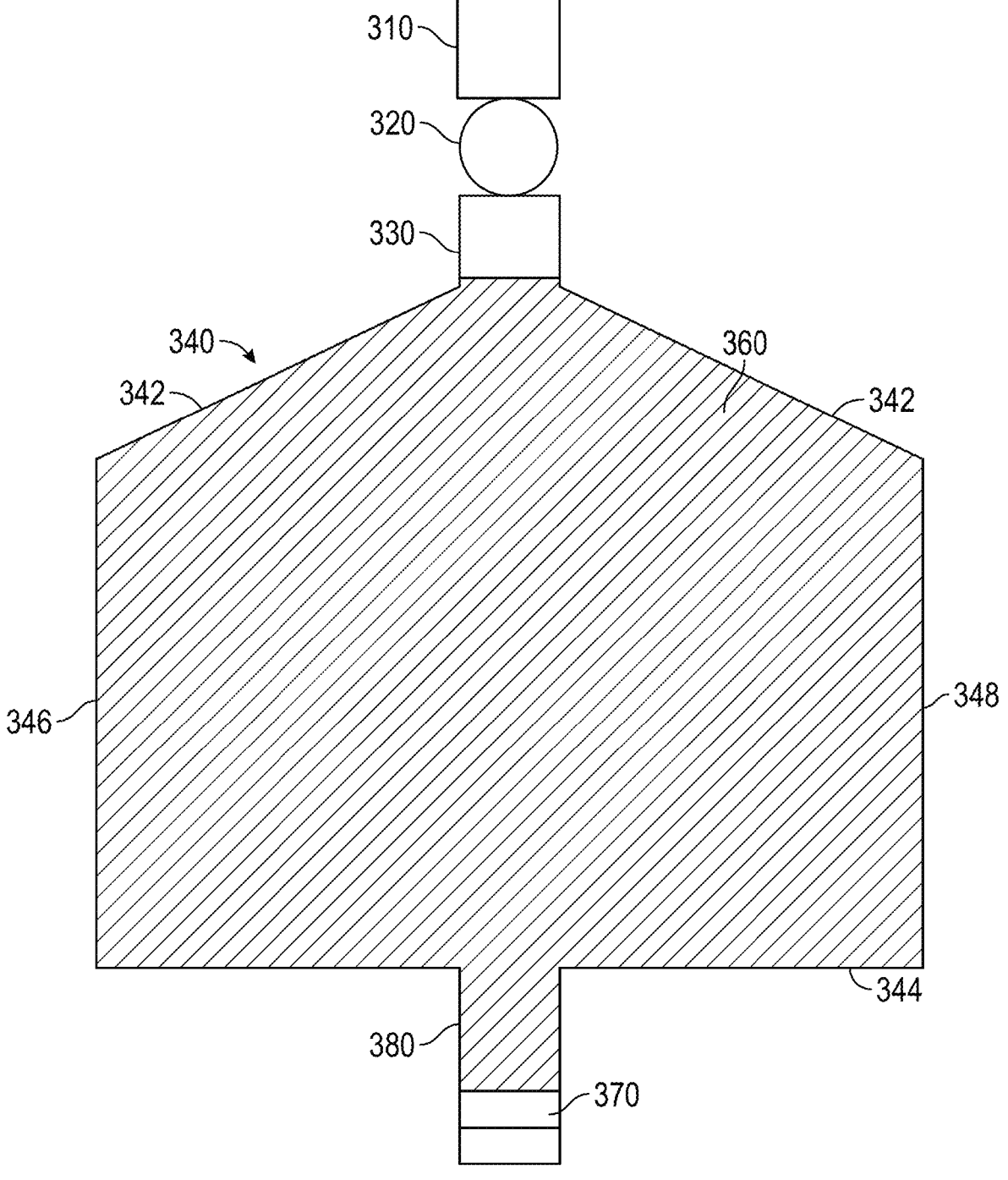
FIG. 3 shows a cross section of the chamber and liquid entry pathway of a smooth degasser where the chamber's ninety degree angle on one of its surfaces (as illustrated in FIG. 1) has been replaced by a smooth transition, eliminating the corner dead zone and avoiding a trapped bubble.

As shown in FIG. 3, another embodiment of the smooth degasification system also includes a cylindrical housing 380 and a piston 370 at the bottom of the cylindrical chamber 340. In FIG. 3, the cylindrical chamber 340 is designed such that the top surface 342 is angled upwards towards the central valve housing 330, rather than perpendicular to the cylinder's sidewalls 346 and 348. Towards the lower portion of the cylindrical chamber 340, the cylinder's sidewalls 346 and 348 are perpendicular to the bottom surface 344 of the cylindrical chamber 340. Due to the top surface 342 being angled upwards towards the central valve housing 330, the bubble 150 retained in the dead zones of the previous version of the cylindrical chamber 140 shown in FIG. 1 is not retained.

Again, these components represent one method of increasing the combined internal volume of the cylindrical chamber 340 and the cylindrical housing 380 above the piston 370. In this degasification method, the piston 370 is raised to its highest point within the cylindrical housing 380, and liquid 360 is added to the cylindrical chamber 340 through the valve 320 at the top of the valve housing 330. This results in the complete filling of the chamber 340 and the valve housing 330. Next, the piston 370 is lowered in the cylindrical housing 380, thereby increasing the combined internal volume of the cylindrical chamber 340 and the cylindrical housing 380 above the piston 370. This creates a head space above the liquid 360 where gas from the liquid 360 fills the space, as the liquid drops down into the combined interior volume of the cylindrical chamber 340 and the cylindrical housing 380 above the piston 370. Gas emerging from the liquid 360 collects in this head space. Subsequently, this gas can be released out of the valve 320 at the top of the cylindrical chamber 340 to finish this degasification cycle of the liquid 360 in the cylindrical chamber 340.

Figure 4:
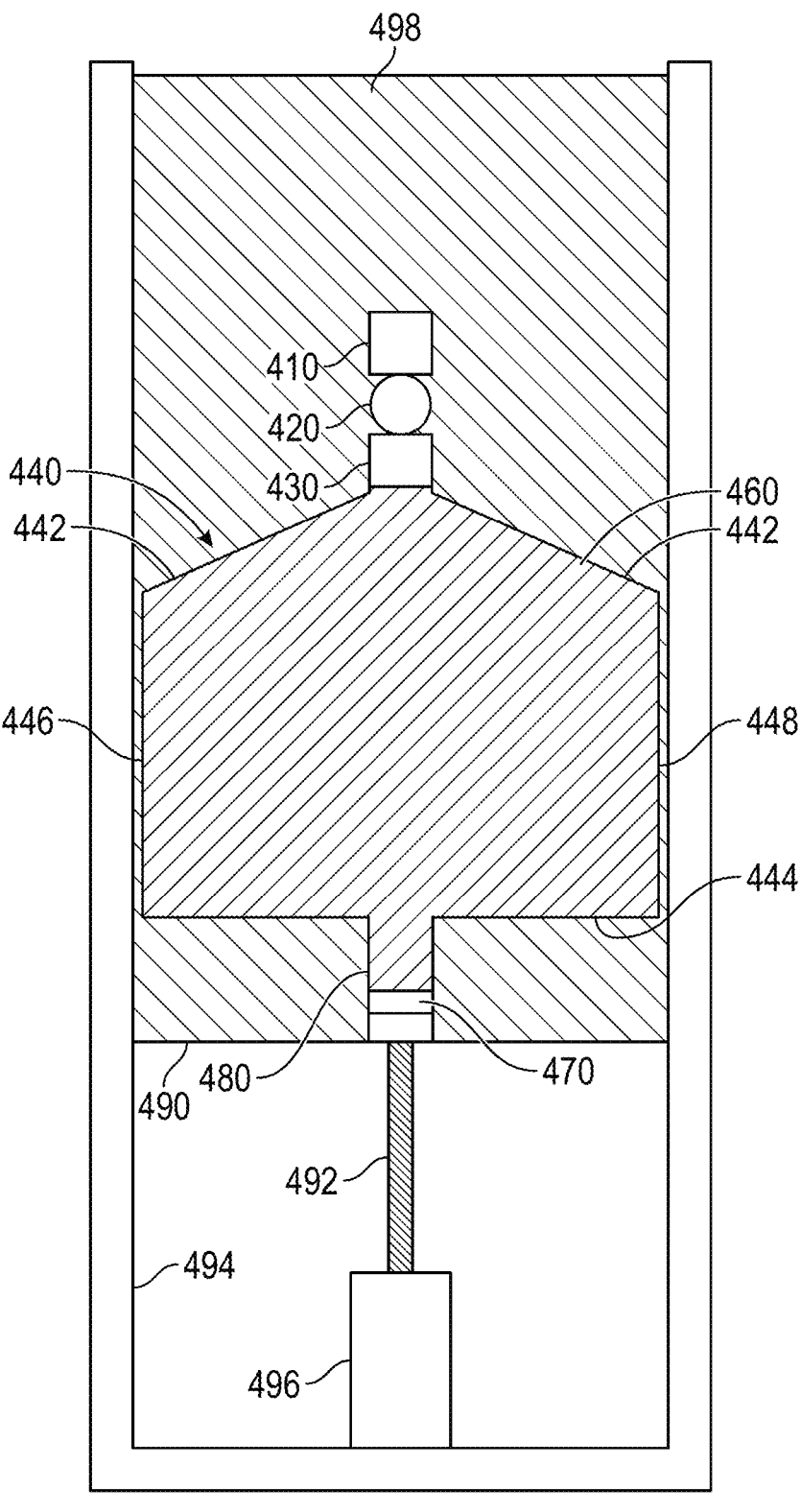
FIG. 4 illustrates a smooth degasser, with a chamber and liquid entry pathway in which the chamber does not have dead zones in contact with the head space, and where the smooth degasser enables the expanding and contracting of a space, and generation of a cavitation.

As shown in FIG. 4, still another embodiment of the smooth degasification system also includes a cylindrical housing 480 and a piston 470 at the bottom of the cylindrical chamber 440. In FIG. 4, the cylindrical chamber 440 is designed such that the top surface 442 is angled upwards towards the central valve housing 430, rather than perpendicular to the cylinder's sidewalls 446 and 448. Towards the lower portion of the cylindrical chamber 440, the cylinder's sidewalls 446 and 448 are perpendicular to the bottom surface 444 of the cylindrical chamber 440. Due to the top surface 442 being angled upwards towards the central valve housing 430, the bubble 150 retained in the dead zones of the previous version of the cylindrical chamber 140 shown in FIG. 1 is not retained.

When this piston 470 moves downward in the cylindrical housing 480, it increases the interior volume of the combined cylindrical chamber 440 and the cylindrical housing 480 above the piston 470. When the piston 470 moves upward in the cylindrical housing 480, it decreases the volume of the combined interior volume of the combined cylindrical chamber 440 and the cylindrical housing 480 above the piston 470. The increased interior volume corresponds to the amount of the interior volume (i.e., head space) beneath the valve 420 which becomes emptied of liquid 460 when the piston 470 moves downward.

In the embodiment shown in FIG. 4, the entire degasification assembly is attached to a car 498 which moves up and down within a track 494. Attached to the track 494 is another actuator 496 with a movable member 492 connected to the car 498. In some embodiments, the movable member 492 is a rod that connects to a piston 490. When the actuator 496 is activated, the movable member 492 moves up and/or down, carrying the combined degasification assembly with it. In this manner, quick movements of the car 498 and attached combined degasification assembly result in the creation of cavitation events within the cylindrical chamber 440.

Figures 5, 6:
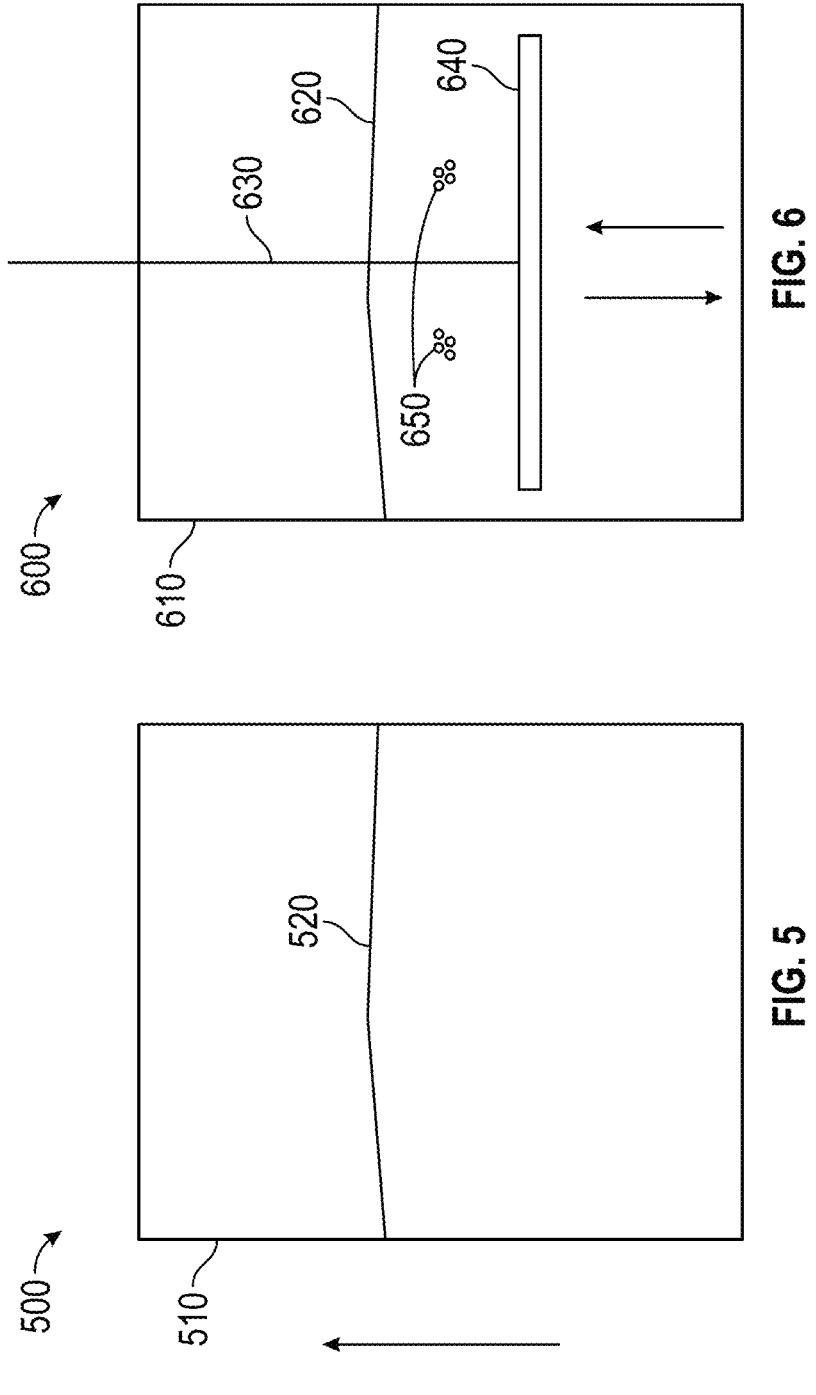
FIG. 5 illustrates a smooth degasser that includes a container in which cavitation is generated by moving the container up and down in a bouncing motion, such as by pneumatical driven motion.
FIG. 6 illustrates a smooth degasser that includes a container, a rod, and a piston, in which cavitation is generated by moving the rod and piston up and down into the interior void of the container in a back and forth motion.

There are many different ways to generate cavitation events. In FIGS. 5-8, various different embodiments are shown that utilize differing techniques and configurations to generate cavitation events. FIG. 5 illustrates a smooth degasser 500 that includes a container 510 and liquid 520, in which cavitation is achieved by moving the container up and down in a bouncing motion, such as by using a pneumatically driven assembly (not shown).

FIG. 6 illustrates a smooth degasser 600 that includes a container 610, liquid 620, a rod 630, and a piston 640, in which cavitation is achieved by moving the rod 630 and piston 640 up and down into the interior void of the container 610 in a back and forth motion. In such an embodiment, the smooth degasification system generates cavitation events 650 via the piston 640 suspended within a liquid 660 inside a container 610. This configuration spares the sides of the container 610 in the smooth degasification system from the effects of cavitation.

A degasification method associated with this smooth degasification system 600 involves repeated agitation of the liquid 660 within the container 610 using the piston 640, which generates multiple cavitation events 650. In other embodiments described below, the piston may be replaced with another type of moving element, such as a propeller 740 (shown in FIG. 7) or an interior plenum 840 (shown in FIG. 8). In another aspect of some embodiments, dissolved gas is removed from liquid using a semi-permeable membrane (not shown) that is permeable to gas but not to the fluid containing the gas.

Figure 7:
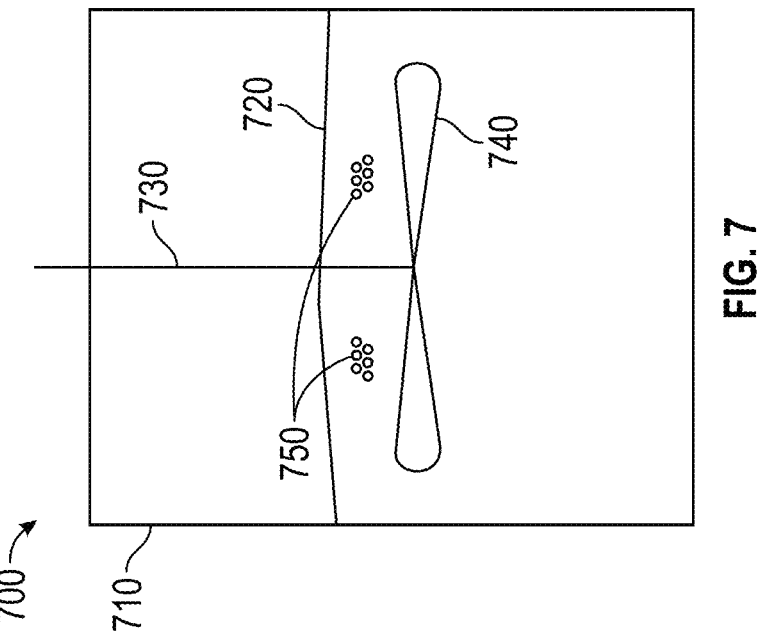
FIG. 7 illustrates a smooth degasser that includes a container, a rod, and a propeller, in which cavitation is generated by moving the rod and propeller into the interior void of the container and rotating the rod and propeller.

Referring now to FIG. 7, another embodiment of a smooth degasser 700 is shown. Specifically, the smooth degasser 700 of FIG. 7 includes a container 710, liquid 720, a rod 730, and a propeller 740, which is used to generate multiple cavitation events 750 (for example, bubbles). In some embodiments, the cavitation events 750 are achieved by moving the rod 730 and propeller 740 into the interior void of the container 710. Next, the rod 730 and propeller 740 are rotated in the liquid 720 to generate multiple cavitation events 750.

Figure 8:
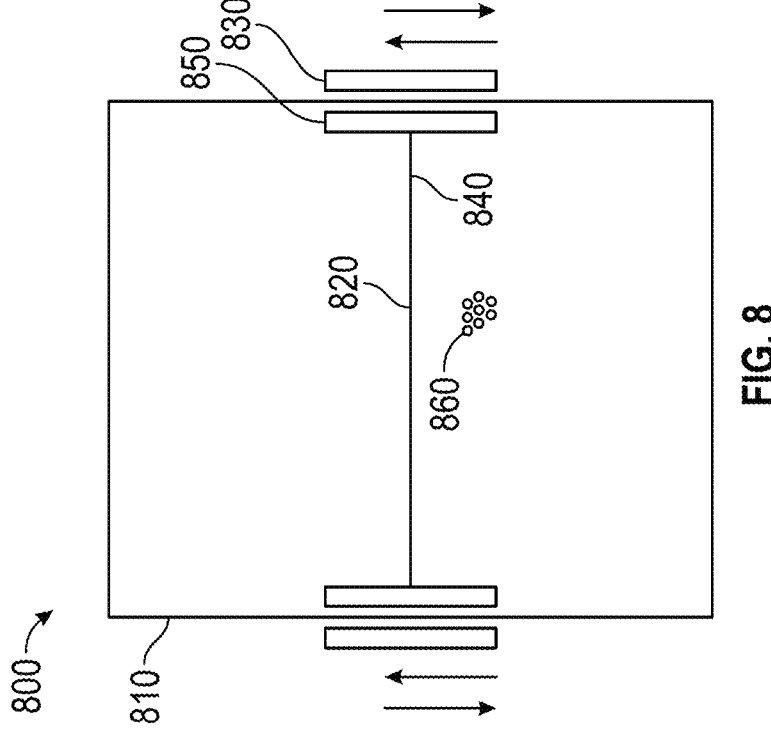
FIG. 8 illustrates a smooth degasser that includes a container, external magnets, and an interior plenum connected to internal magnets, in which the external magnets generate cavitations by moving up and down, and driving the magnetically connected interior plenum and internal magnets motion up and down inside the container.

FIG. 8 illustrates a smooth degasser 800 that includes a container 810, liquid 820, external magnets 830, and an interior plenum 840 connected to internal magnets 850. The external magnets 830 are moved "up and down", and correspondingly drive the magnetically connected internal magnets 850 and interior plenum 840 in an "up and down"

motion inside the container 810, which generates cavitation events 860 (for example, bubbles).

In this embodiment of FIG. 8, there is no physical contact between the external magnets 830 and the internal magnets 850, either directly or by intermediary components. Instead, it is purely the magnetic connection that enables the movement of the external magnets 830 to drive the movement of the internal magnets 850 and connected plenum 840 to create cavitation events 860.

EXAMPLE EMBODIMENTS

Example 1

In one embodiment, a low energy degasification system is disclosed that includes a chamber assembly, one or more of a plurality of valves, an expansion system, and a cavitation generator. The chamber assembly has a top, a bottom, and side walls with interior surfaces. Additionally, the chamber assembly is configured to contain a quantity of liquid. The one or more of a plurality of valves are configured to enable liquid to enter and exit the chamber assembly. At least one of the one or more valves is a top valve that is attached to the top of the chamber assembly. When the liquid injected into the chamber assembly completely fills the internal volume of the chamber assembly to the top valve, it displaces any gas inside the chamber assembly during the filling of the chamber assembly. The expansion system is configured to expand and contract an internal volume of the chamber assembly while the chamber assembly remains sealed. The expanding of the internal volume of the chamber assembly by the expansion system causes the liquid to move towards the bottom of the chamber assembly, partially evacuate the chamber assembly, and create a head space above the liquid in the chamber assembly.

Additionally, the cavitation generator is associated with the chamber assembly. The activation of the cavitation generator creates motion in the liquid within the partially evacuated chamber assembly that generates cavitation events within the liquid and removes dissolved gas from the liquid. In one embodiment, the cavitation events are gas bubbles. The interior surface of the chamber assembly has a shape, construction, and surface smoothness that enable release of the gas bubbles that adhere to the surface, in response to liquid flow within the chamber assembly. The contraction of the chamber assembly, via the expansion system, creates the liquid flow within the chamber assembly that releases any gas bubbles adhering to interior surfaces of the chamber assembly, prevents dead zones from forming within the head space that was created when the chamber assembly was expanded, and coalesces the gas bubbles into the head space.

In some embodiments of the degasification system, the expansion system includes a piston and cylinder that are attached to the chamber assembly to form the internal volume capable of being expanded by moving the piston within the cylinder. In another aspect of the degasification system, the activation of the cavitation generator includes physical movement of the chamber assembly at a velocity and direction that generates one or more cavitation events. In still another aspect, the degasification system further includes a sonic projector that generates one or more of sound waves or ultrasound waves within the chamber assembly. The sonic projector generates cavitation events in the liquid with the chamber assembly using the generated one or more of sound waves or ultrasound waves. In yet another aspect, the degasification system further includes a sonic projector that generates one or more of sound waves or ultrasound waves within the chamber assembly that facilitate release of gas bubbles adhering to the interior surfaces of the chamber assembly.

In one or more embodiments of the degasification system, the cavitation generator includes one or more of a rod and piston, a rod and propeller, a pneumatic actuator, and an internal and external magnetic system with an associated interior plenum. In another aspect of the degasification system, the cavitation generator includes a track and car system, wherein the car system is attached to the chamber assembly, and wherein movements of the car system and attached chamber assembly along the track result in cavitation events.

Example 2

Embodiments of a low energy degasification method are also disclosed. The low energy degasification method includes providing a chamber assembly having a top, a bottom, and side walls with interior surfaces, the chamber assembly configured to contain a quantity of liquid, and one or more of a plurality of valves configured to enable liquid to enter and exit the chamber assembly. At least one of the one or more valves is the top valve that is attached to the top of the chamber assembly. The interior surface of the chamber assembly has a shape, construction, and surface smoothness that enables release of gas bubbles that adhere to the surface, in response to liquid flow within the chamber assembly. The low energy degasification method also includes injecting a liquid into the chamber assembly to completely fill an internal volume of the chamber assembly to the top valve, and displace any gas inside the chamber assembly during the filling of the chamber assembly.

Additionally, the low energy degasification method includes expanding the internal volume of the chamber assembly, via an expansion system, to cause the liquid to move towards the bottom of the chamber assembly, create a vacuum within the chamber assembly, and create a head space above the liquid in the chamber assembly. Further, the low energy degasification method includes generating cavitation events in the liquid that removes dissolved gas from the liquid, via activation of a cavitation generator, by creating motion in the liquid within the partially evacuated chamber assembly. Moreover, the low energy degasification method includes contracting the internal volume of the chamber assembly, via the expansion system, to create liquid flow within the chamber assembly that releases any gas bubbles adhering to interior surfaces of the chamber assembly, prevents dead zones from forming within the head space that was created when the chamber assembly was expanded, and coalesces the gas bubbles into the head space. Finally, the low energy degasification method includes removing the air collected in the head space from the chamber assembly out of the top valve.

In some embodiments of the degasification method, the expanding of the internal volume of the chamber assembly, generating of the cavitation events, contracting of the internal volume of the chamber assembly, and removing of the head space from the chamber assembly are defined as a degasification cycle. Additionally, in some embodiments, the degasification method further includes initiating multiple degasification cycles to remove gas from the liquid during each of the multiple degasification cycles. In another aspect of the degasification method, the expansion system comprises a piston and cylinder that are attached to the chamber assembly to form the internal volume capable of being expanded by moving the piston within the cylinder. In still another aspect of the degasification method, the activation of a cavitation generator further comprises generating physical movement of the chamber assembly at a velocity and direction that generates one or more cavitation events.

In one or more embodiments, the degasification method further includes generating one or more of sound waves or ultrasound waves within the chamber assembly using a sonic projector. The sonic projector generates cavitation events in the liquid with the chamber assembly using the generated one or more of sound waves or ultrasound waves. In another aspect, the degasification method further includes generating one or more of sound waves or ultrasound waves within the chamber assembly that facilitate release of gas bubbles adhering to the interior surfaces of the chamber assembly. In still another aspect of the degasification method, the cavitation generator includes one or more of a rod and piston, a rod and propeller, a pneumatic actuator, and an internal and external magnetic system with an associated interior plenum. In yet another aspect of the degasification method, the cavitation generator includes a track and car system, wherein the car system is attached to the chamber assembly, and wherein movements of the car system and attached chamber assembly along the track result in cavitation events.

Example 3

Embodiments of another degasification system are also disclosed that include a chamber assembly, an expansion system, and a cavitation generator. The chamber assembly has side walls with interior surfaces and a valve that is attached to the chamber assembly. Additionally, the chamber assembly is configured to contain a quantity of liquid that is injected into the chamber assembly and completely fills an internal volume of the chamber assembly, thereby displacing any gas inside the chamber assembly. The expansion system is configured to expand and contract the internal volume of the chamber assembly while the chamber assembly remains sealed. The expanding of the internal volume of the chamber assembly creates a vacuum within the chamber assembly and creates a head space above the liquid in the chamber assembly. The cavitation generator is associated with the chamber assembly, and activation of the cavitation generator creates motion in liquid within the pressurized chamber assembly that generates gas bubbles within the liquid and removes dissolved gas from the liquid. The bubbles rise to the surface and the gas fills the head space above the liquid. Additionally, the interior surface of the chamber assembly has a shape, construction, and surface smoothness that enables release of the gas bubbles from interior surfaces of the chamber assembly in response to liquid flow within the chamber assembly from contraction of the chamber assembly that pushes the gas in the head space out of the chamber through the valve.

In some embodiments of the degasification system, the expansion system includes a piston and cylinder that are attached to the chamber assembly to form the internal volume capable of being expanded by moving the piston within the cylinder. In another aspect, the cavitation generator includes one or more of a rod and piston, a rod and propeller, a pneumatic actuator, and an internal and external magnetic system with an associated interior plenum. In still another aspect, the cavitation generator includes a track and car system, wherein the car system is attached to the chamber assembly, and wherein movements of the car system and attached chamber assembly along the track result in cavitation events.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but are not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one implementation" or "an implementation" means that a particular feature, structure, or characteristic may be combined in any suitable manner in one or more implementations. As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

Some portions of the detailed descriptions herein may be presented in terms of algorithms and symbolic representations of operations. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

All publications, including patent documents, scientific articles, and/or databases referred to in this application, are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A low energy degasification system, comprising:
a chamber assembly having interior surfaces, the chamber assembly configured to contain a quantity of liquid;
one or more of a plurality of valves configured to enable liquid to enter and exit the chamber assembly, wherein at least one of the one or more valves is a top valve that is attached to a top of the chamber assembly, wherein the liquid injected into the chamber assembly completely fills an internal volume of the chamber assembly to the top valve, displacing any gas inside the chamber assembly during the filling of the chamber assembly;
an expansion system configured to expand and contract the internal volume of the chamber assembly while the chamber assembly remains sealed, wherein the expanding of the internal volume of the chamber assembly by the expansion system causes the liquid to move towards the bottom of the chamber assembly, creates a vacuum within the chamber assembly, and create a head space above the liquid in the chamber assembly; and
a cavitation generator associated with the chamber assembly, wherein activation of the cavitation generator creates motion in the liquid within the pressurized chamber assembly that generates cavitation events within the liquid, and accelerates the generation of bubbles from dissolved gas in the liquid, wherein gas bubbles emerge, rise to, and empty into the head space above the liquid,
wherein the interior surface of the chamber assembly has a shape, construction, and surface smoothness that enables release of the gas bubbles which adhere to the interior surfaces in response to liquid flow within the chamber assembly, and
wherein contraction of the chamber assembly, via the expansion system, creates the liquid flow within the chamber assembly that releases any gas bubbles adhering to interior surfaces of the chamber assembly, prevents dead zones from forming within the head space that was created when the chamber assembly was expanded, and pushes the gas in the head space out of the chamber assembly through the one or more top valves.

2. The system of claim 1, wherein the expansion system comprises a piston and cylinder that are attached to the chamber assembly to form the internal volume capable of being expanded by moving the piston within the cylinder.

3. The system of claim 1, wherein the activation of the cavitation generator further comprises physical movement of the chamber assembly at a velocity and direction that generates one or more cavitation events.

4. The system of claim 1, further comprising a sonic projector that generates one or more of sound waves or ultrasound waves within the chamber assembly, wherein the sonic projector generates cavitation events in the liquid in the chamber assembly using the generated one or more of sound waves or ultrasound waves.

5. The system of claim 1, further comprising a sonic projector that generates one or more of sound waves or ultrasound waves within the chamber assembly.

6. The system of claim 1, wherein the cavitation generator includes one or more of a rod and piston, a rod and propeller, a pneumatic actuator, and an internal and external magnetic system with an associated interior plenum.

7. The system of claim 1, wherein the cavitation generator includes a track and car system, wherein the car system is attached to the chamber assembly, and wherein movements of the car system and attached chamber assembly along the track result in cavitation events.

8. A low energy degasification system, comprising:

a chamber assembly having side walls with interior surfaces and a valve that is attached to the chamber assembly, the chamber assembly configured to contain a quantity of liquid that is injected into the chamber assembly and completely fills an internal volume of the chamber assembly, displacing any gas inside the chamber assembly;

an expansion system configured to expand and contract the internal volume of the chamber assembly while the chamber assembly remains sealed, wherein the expanding of the internal volume of the chamber assembly creates a vacuum within the chamber assembly and creates a head space above the liquid in the chamber assembly; and a cavitation generator associated with the chamber assembly, wherein activation of the cavitation generator creates motion in the liquid within the vacuumed chamber assembly that accelerates the generation of gas bubbles within the liquid, wherein the interior surface of the chamber assembly has a shape, construction, and surface smoothness that enables release of the gas bubbles from interior surfaces of the chamber assembly, in response to liquid flow within the chamber assembly from contraction of the chamber assembly that pushes the gas in the head space out of the chamber assembly through the valve.

9. The system of claim 8, wherein the expansion system comprises a piston and cylinder that are attached to the chamber assembly to form the internal volume capable of being expanded by moving the piston within the cylinder.

10. The system of claim 8, wherein the cavitation generator includes one or more of a rod and piston, a rod and propeller, a pneumatic actuator, and an internal and external magnetic system with an associated interior plenum.

11. The system of claim 8, wherein the cavitation generator includes a track and car system, wherein the car system is attached to the chamber assembly, and wherein movements of the car system and attached chamber assembly along the track result in cavitation events.

\* \* \* \* \*